United States Patent
Huang (10) Patent No.: US 8,052,281 B2
(45) Date of Patent: Nov. 8, 2011

(54) DUAL DMD PROJECTOR HAVING A MODULAR HEAT DISSIPATION DEVICE

(75) Inventor: Junejei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 622 days.

(21) Appl. No.: 12/037,232

(22) Filed: Feb. 26, 2008

(65) Prior Publication Data
US 2009/0027624 A1    Jan. 29, 2009

(30) Foreign Application Priority Data
Jul. 24, 2007   (TW) .............................. 96126993 A (51) Int. Cl.
G03B 21/00   (2006.01)
G03B 21/16   (2006.01)
G03B 21/18   (2006.01)
G03B 21/26   (2006.01)

(52) U.S. Cl. ................. 353/52; 353/31; 353/55; 353/94

(58) Field of Classification Search ............... 353/30–31, 353/33, 85, 94, 122, 52, 54–55, 57–58, 60; 348/771, 801
See application file for complete search history.

(56) References Cited

U.S. PATENT DOCUMENTS

| | | | | |
|---|---|---|---|---|
| 5,170,194 A * | 12/1992 | Kurematsu et al. | ............. | 353/52 |
| 5,612,753 A * | 3/1997 | Poradish et al. | ............. | 348/743 |
| 6,412,972 B1 * | 7/2002 | Pujol et al. | ..................... | 362/272 |
| 7,252,385 B2 * | 8/2007 | Engle et al. | ....................... | 353/52 |
| 7,270,418 B2 * | 9/2007 | Fujimori et al. | ................. | 353/54 |
| 7,296,898 B2 | 11/2007 | Wu | | |
| 7,300,182 B2 * | 11/2007 | Mazzochette | .................. | 362/294 |
| 7,325,932 B2 * | 2/2008 | Sakata | ............................ | 353/85 |
| 7,364,302 B2 * | 4/2008 | Conner | .......................... | 353/20 |
| 7,578,595 B2 * | 8/2009 | Miwa et al. | ....................... | 353/54 |
| 7,766,490 B2 * | 8/2010 | Harbers et al. | ................... | 353/94 |
| 7,806,531 B2 * | 10/2010 | Zakoji et al. | ..................... | 353/52 |
| 2002/0196413 A1 * | 12/2002 | Kwok et al. | .................... | 353/20 |

(Continued)

FOREIGN PATENT DOCUMENTS

CN         1645250 A         7/2005
(Continued)

OTHER PUBLICATIONS

Office Action from corresponding Taiwanese Application No. 096126993, dated Apr. 13, 2011. English machine translation attached.

*Primary Examiner* — Tony Ko
*Assistant Examiner* — Jori S Reilly-Diakun
(74) *Attorney, Agent, or Firm* — Grossman, Tucker, Perreault & Pfleger, PLLC (57) ABSTRACT

A projection apparatus arranged such that the first light source, the second light source and the third light source provide the first colored light, the second colored light and the third colored light, respectively. The first digital micromirror device (DMD) modulates and reflects the first colored light, while the second DMD modulates and reflects the second and third colored lights guided by the first light guiding device. Subsequently, the second light guiding device guides the colored lights reflected from the first DMD and the second DMD to the projection lens.

19 Claims, 6 Drawing Sheets

U.S. PATENT DOCUMENTS

| | | |
|---|---|---|
| 2003/0133079 A1* | 7/2003 | Cobb .............................. 353/31 |
| 2005/0001995 A1* | 1/2005 | Dewald et al. .................. 353/84 |
| 2005/0213051 A1 | 9/2005 | Smet |
| 2005/0254013 A1 | 11/2005 | Engle et al. |
| 2006/0066540 A1* | 3/2006 | Hewlett et al. .................. 345/84 |
| 2006/0077353 A1 | 4/2006 | Wu |
| 2006/0268236 A1 | 11/2006 | Prince |
| 2008/0143967 A1* | 6/2008 | Bierhuizen et al. ............. 353/20 |

FOREIGN PATENT DOCUMENTS

| | | |
|---|---|---|
| TW | I245158 | 12/2005 |

* cited by examiner

DUAL DMD PROJECTOR HAVING A MODULAR HEAT DISSIPATION DEVICE

This application claims the benefit from the priority of Taiwan Patent Application No. 096126993 filed on Jul. 24, 2007, the disclosure of which is incorporated by reference herein in its entirety.

CROSS-REFERENCES TO RELATED APPLICATIONS

Not applicable.

BACKGROUND OF THE INVENTION

1. Field of the Invention

The present invention relates to a projection apparatus that uses two digital micromirror devices (DMDs) and adopts light emitting diodes (LEDs) as the light source.

2. Descriptions of the Related Art

Currently, projection apparatuses have found a widespread use in offices, households, conference rooms and the like as imaging devices. Among various projection apparatuses, the digital light processing (DLP) projection apparatus, which applies both digital projection and display technologies, is capable of receiving a digital signal to generate a sequence of digital light pulses. The main concept of the DLP technology is to use a digital micromirror device (DMD) with a plurality of micromirrors, so that the light projected on these micromirrors will be reflected onto an imaging lens to form an image.

A projection apparatus can use three DMDs for each of the three primary colors to achieve a luminance of up to several thousands lumens and a high resolution. However, the expensive DMDs and more optical elements are required for achieving the desired effect tend to increase the cost of the product significantly. On the other hand, reducing the number of DMDs may reduce costs, but will degrade the luminance and resolution thereof. Therefore, a projection apparatus with two DMDs that have satisfactory optical efficiency has been developed in the art.

Figure 1:
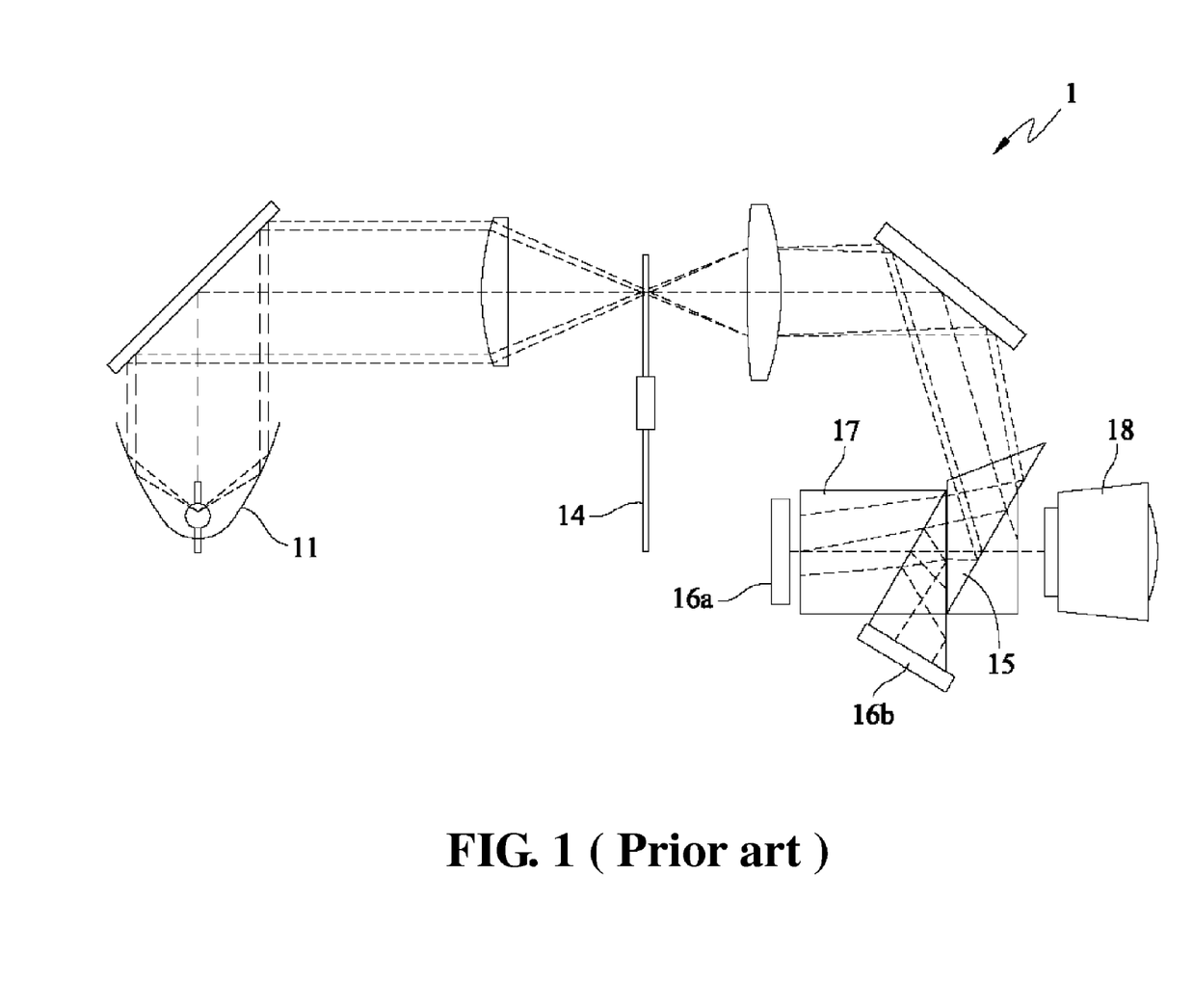
FIG. 1 is a schematic view of a conventional DLP projection apparatus.

A conventional DLP projection apparatus comprising two DMDs is depicted in FIG. 1. The projection apparatus 1 mainly comprises a light source 11, a color wheel 14, a total internal reflection (TIR) prism 15, two DMDs 16a, 16b, a dichroic mirror 17, and a projection lens 18. The light source 11 is generally an ultra high pressure (UHP) mercury lamp. In more detail, light emitted from the light source 11 is converted into two kinds of colors by two kinds of segments of the color wheel 14. After entering the TIR prism 15, the light beams of two kinds of colors are further separated by the dichroic mirror 17 into three primary colors and projected onto the two DMDs 16a, 16b. Since the UHP mercury lamp has a poor red light spectrum, one DMD 16a is used for red color and the other DMD 16b is used for green and blue colors. Upon reflection from the DMDs 16a, 16b, the light beams are recombined and projected out of the projection lens 18 through the TIR prism 15.

However, a conventional DLP projection apparatus that employs a UHP mercury lamp as the light source 11 suffers from a number of disadvantages. Since the UHP mercury lamp relies on the excitation of mercury to generate ultraviolet light and thereby to provide a light source with high luminance, it takes a long time for the luminance to increase to the desired level. Furthermore, to generate light beams of the three primary colors, a color wheel has to be used in conjunction with the UHP mercury lamp, which may decrease the service life, be difficult to replace, decrease the color gamut, pollute the environment, consume power, and occupy a large space.

In summary, a conventional projection apparatus using two DMDs and an UHP mercury lamp is still deficient in performance, heat dissipation, and color gamut. In view of this, it is important to provide a projection apparatus that uses two DMDs and has a higher efficiency, wider color gamut, smaller profile, simpler structure, more inexpensive cost, and reduced starting time.

SUMMARY OF THE INVENTION

One objective of this invention is to provide a projection apparatus that uses only two DMDs to control the light beams of the three primary colors.

Another objective of this invention is to provide a projection apparatus that uses LEDs as a light source. In addition, the light source has a long life, is convenient to maintain and responds fast. Yet a further objective of this invention is to provide a projection apparatus that has an increased luminance, improved light emitting efficiency, sufficient light flux, and maintains a continuous light emission without an interruption visible to naked eyes.

To this end, a projection apparatus of this invention comprises a first light source, a second light source, a third light source, a first light guiding device, a first digital micromirror device (DMD), a second DMD, and a second light guiding device. The first light source provides the first colored light, while the second light source provides the second colored light. Likewise, the third light source provides the third colored light. The first light guiding device guides the second colored light and the third colored light. The first DMD modulates and reflects the first colored light. Similarly, the second DMD modulates and reflects the guided second and third colored lights. The second light guiding device guides the colored lights from the first DMD and the second DMD to the projection lens.

For example, the projection apparatus of this invention may comprise a green LED, a red LED, a blue LED, a first DMD, and a second DMD. The green LED is configured to emit a green light, the red LED is configured to emit a red light, and the blue LED is configured to emit a blue light. The first DMD is configured to modulate and reflect the green light, while the second DMD is configured to modulate and reflect the red and the blue lights. The red LED and the blue LED are illuminated alternately.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2A:
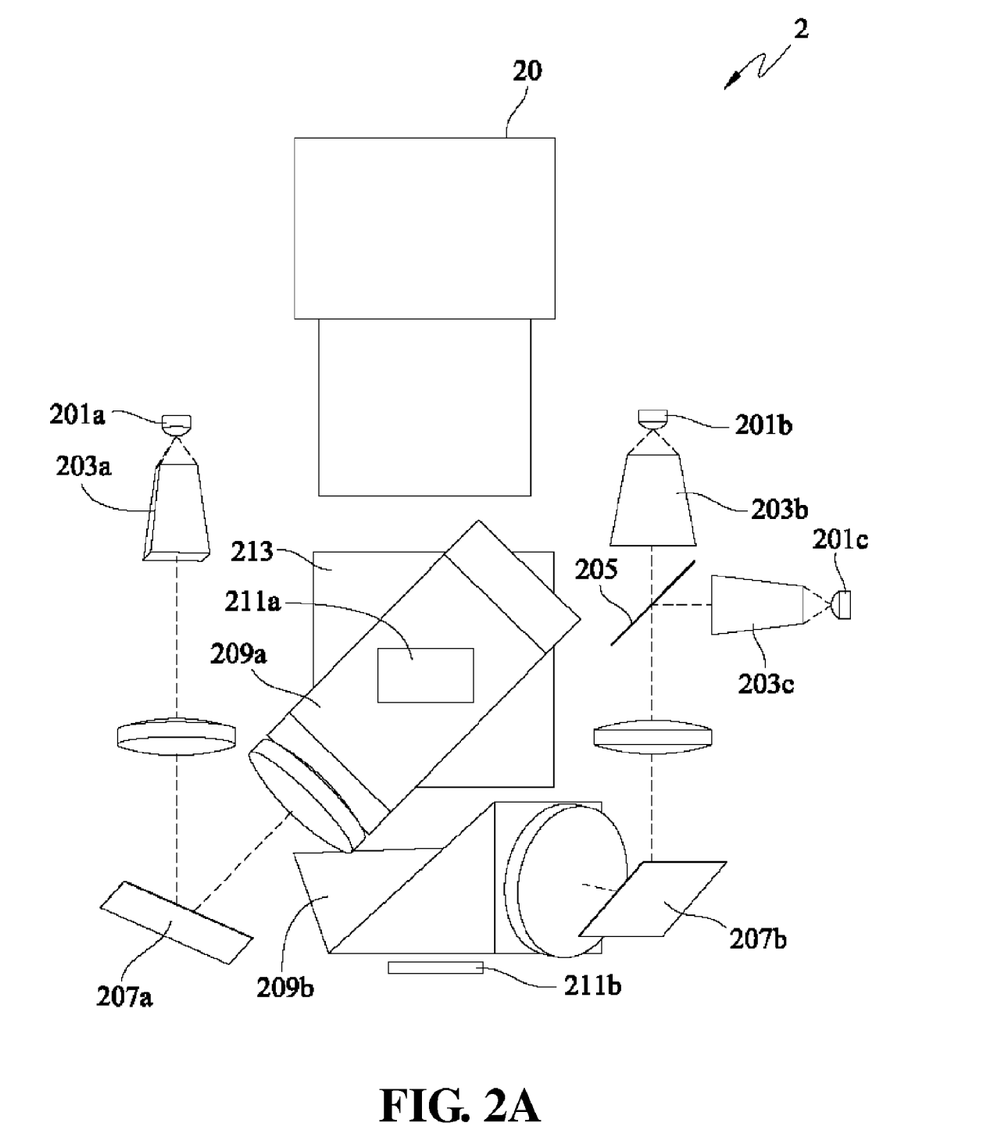
FIG. 2A is a top view of a projection apparatus in accordance with a first embodiment of this invention.
Figure 2B:
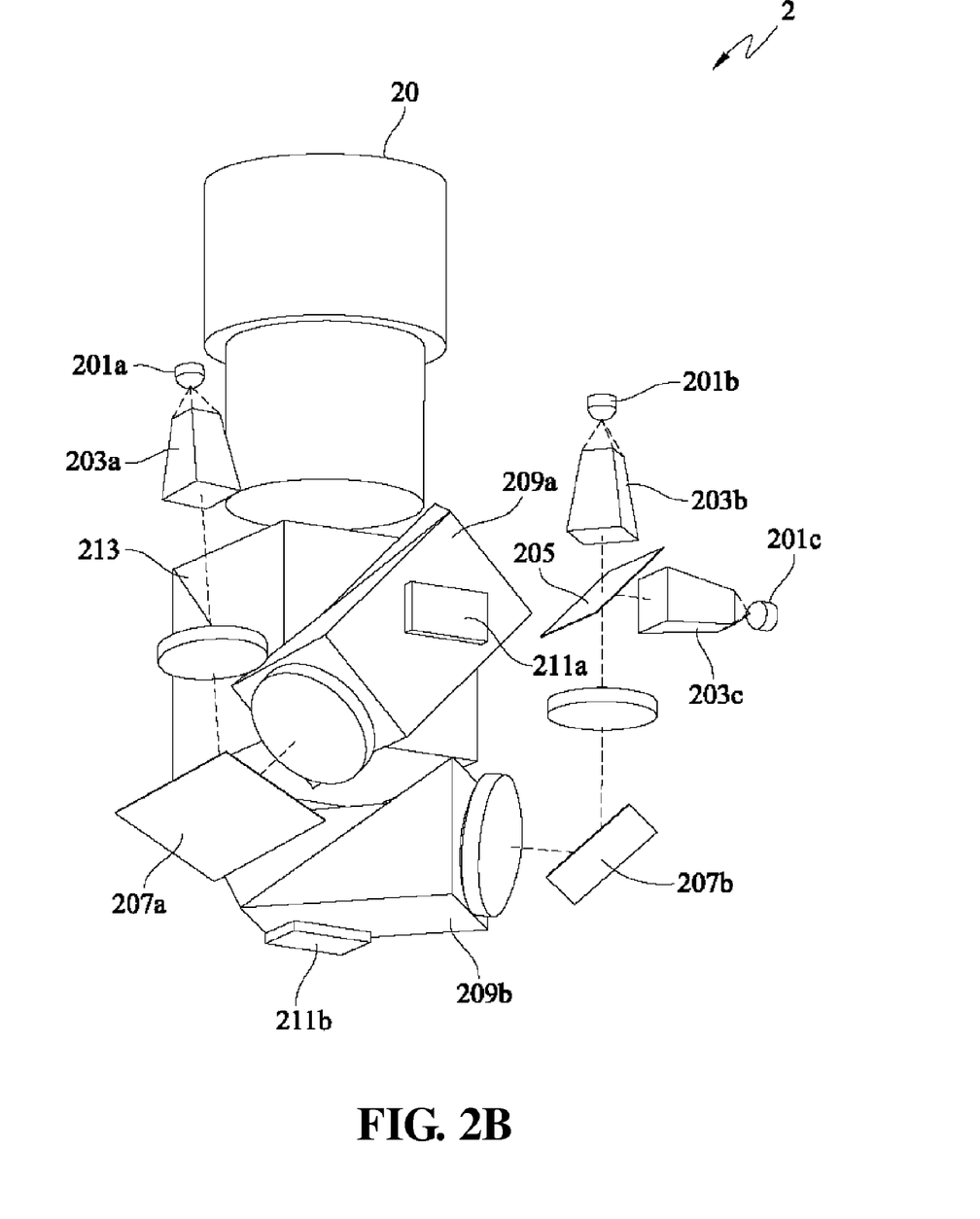
FIG. 2B is a perspective view of the projection apparatus in accordance with the first embodiment of this invention.

A first embodiment of this invention is a projection apparatus. FIG. 2A illustrates a top view while FIG. 2B illustrates a perspective view of the first embodiment. The projection apparatus 2 comprises a first light source 201a, a second light source 201b, a third light source 201c, a first integration rod 203a, a second integration rod 203b, a third integration rod 203c, a first light guiding device 205, a first reflector 207a, a second reflector 207b, a first prism 209a, a second prism 209b, a first DMD 211a, a second DMD 211b, and a second light guiding device 213. Preferably, both the first prism 209a and the second prism 209b are total internal reflection (TIR) prisms.

The first light source 201a emits a first colored light, while the second light source 201b is adapted to emit a second colored light. The third light source 201c is adapted to emit a third colored light. In this embodiment, the first light source 201a, the second light source 201b, and the third light source 201c are a green LED, a red LED, and a blue LED, respectively. Therefore, the first colored light, the second colored light, and the third colored light are green light, red light, and blue light, respectively.

For each of these colored lights, a plurality of LEDs may also be provided to form an LED array, which will readily occur to those of ordinary skill in the art and will not be described in detail herein. In this embodiment, the red LED and the blue LED are configured to alternately emit light with a duty cycle of 50%, while the green LED is configured to emit light continuously, i.e., with a duty cycle of 100%. The 50% duty cycle is only illustrative, and in other embodiments, the allocation of the duty cycle between the red and the blue LEDs may be adjusted depending on the actual requirements. For example, the red LED may emit light with a duty cycle of about 40% to 60%, with the blue LED emitting light with a complementary duty cycle.

The first integration rod 203a, the second integration rod 203b, and the third integration rod 203c are disposed adjacent to the first light source 201a, the second light source 201b, and the third light source 201c, respectively, to uniformize and guide the first colored light, second colored light, and third colored light emitted therefrom.

The first light guiding device 205 of the projection apparatus 2 guides the second colored light and the third colored light that have been uniformized through the second integration rod 203b and the third integration rod 203c, respectively. The preferred first light guiding device 205 is a dichroic mirror.

Specifically, the first colored light exiting the first integration rod 203a projects onto the first DMD 211a through the first reflector 207a and the first prism 209a successively. In contrast, the second colored light and the third colored light exiting the second integration rod 203b and the third integration rod 203c are first selectively guided to the second reflector 207b through the first light guiding device 205 before projecting onto the second DMD 211b through the second reflector 207b and the second prism 209b successively.

Subsequently, the first DMD 211a modulates the first colored light and reflects it back into the first prism 209a, while the second DMD 211b modulates both the second colored light and the third colored light and reflects them back into the second prism 209b. Thereafter, the first prism 209a and the second prism 209b guide the reflected colored lights into the second light guiding device 213. The second light guiding device 213 combines the colored lights guided by the first prism 209a and the second prism 209b, and constructs a combined image thereafter. The combined image is then transmitted to a projection lens set 20 in the projection apparatus 2 to be projected onto a screen (not shown). In this embodiment, the preferred second light guiding device 213 is a dichroic cube.

Figure 3A:
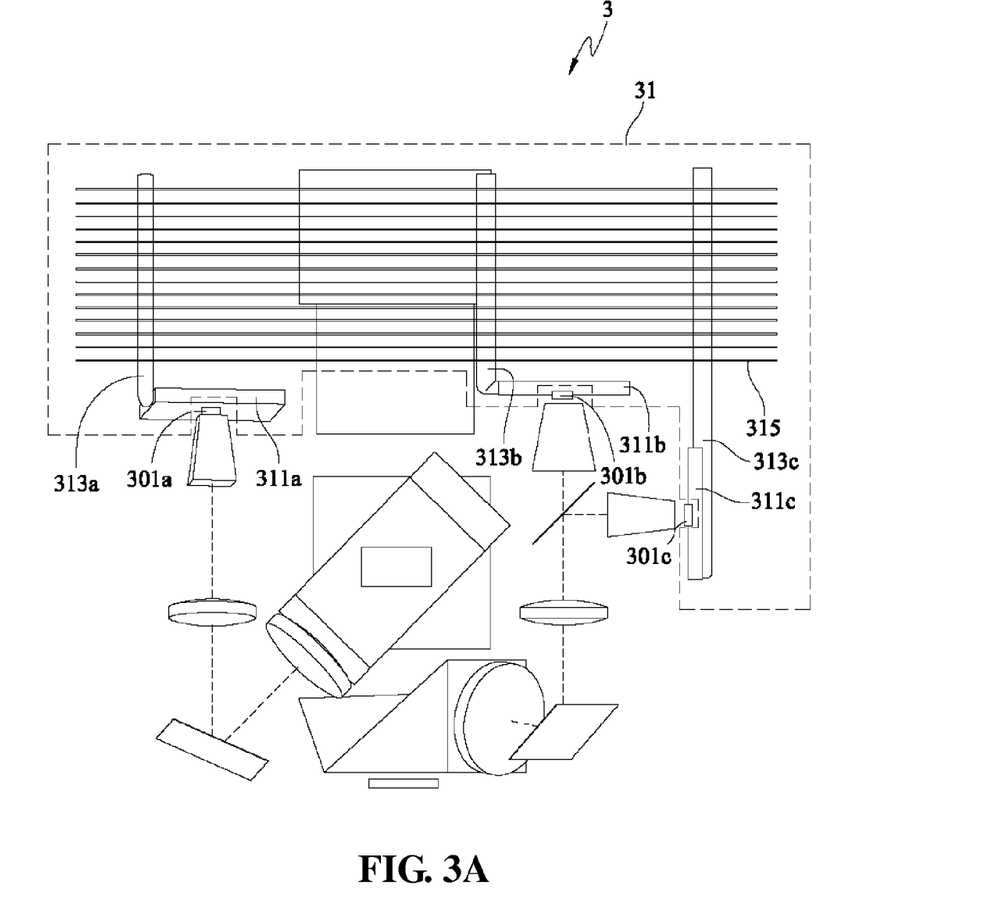
FIG. 3A is a bottom view of a projection apparatus in accordance with a second embodiment of this invention.
Figure 3B:
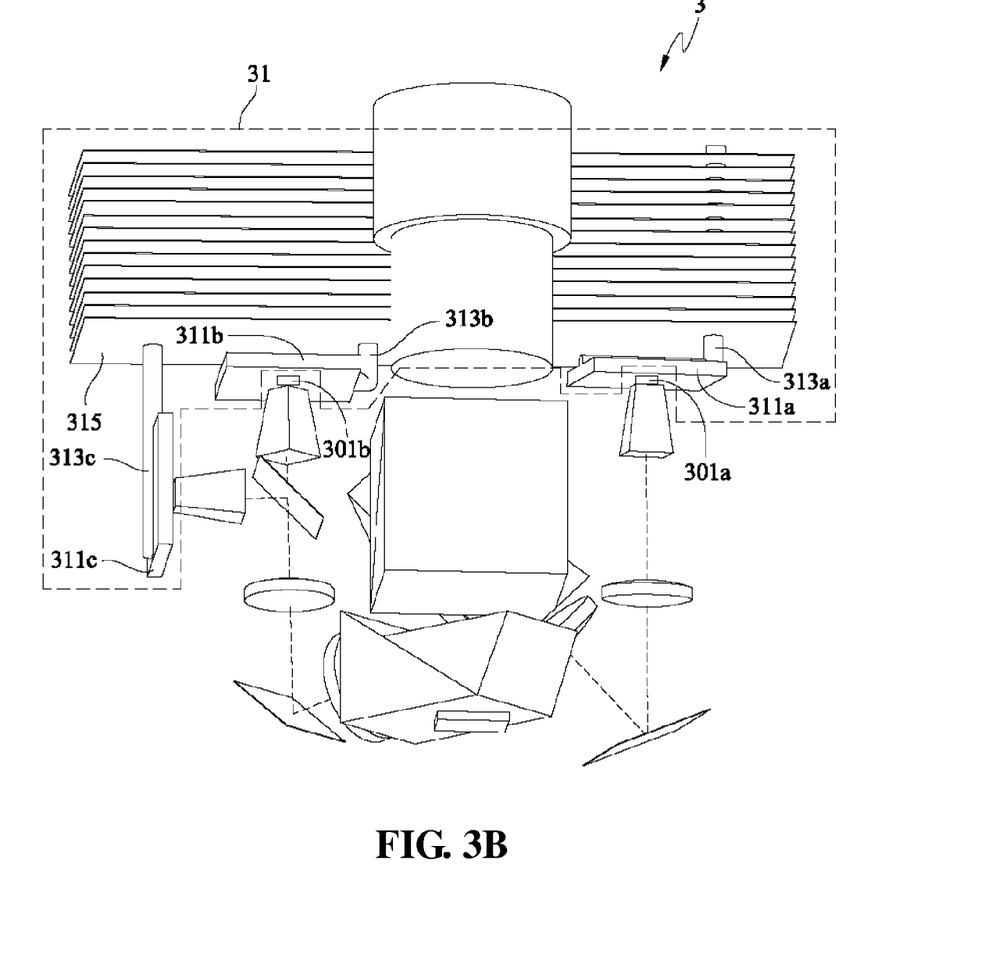
FIG. 3B is a top view of the projection apparatus in accordance with the second embodiment of this invention.

A second embodiment of this invention is also a projection apparatus. FIG. 3A illustrates the top view of the embodiment, while FIG. 3B illustrates the bottom view. In addition to all the elements described in the first embodiment, the projection apparatus 3 further comprises a heat dissipation device 31 for dissipating heat.

Figure 4:
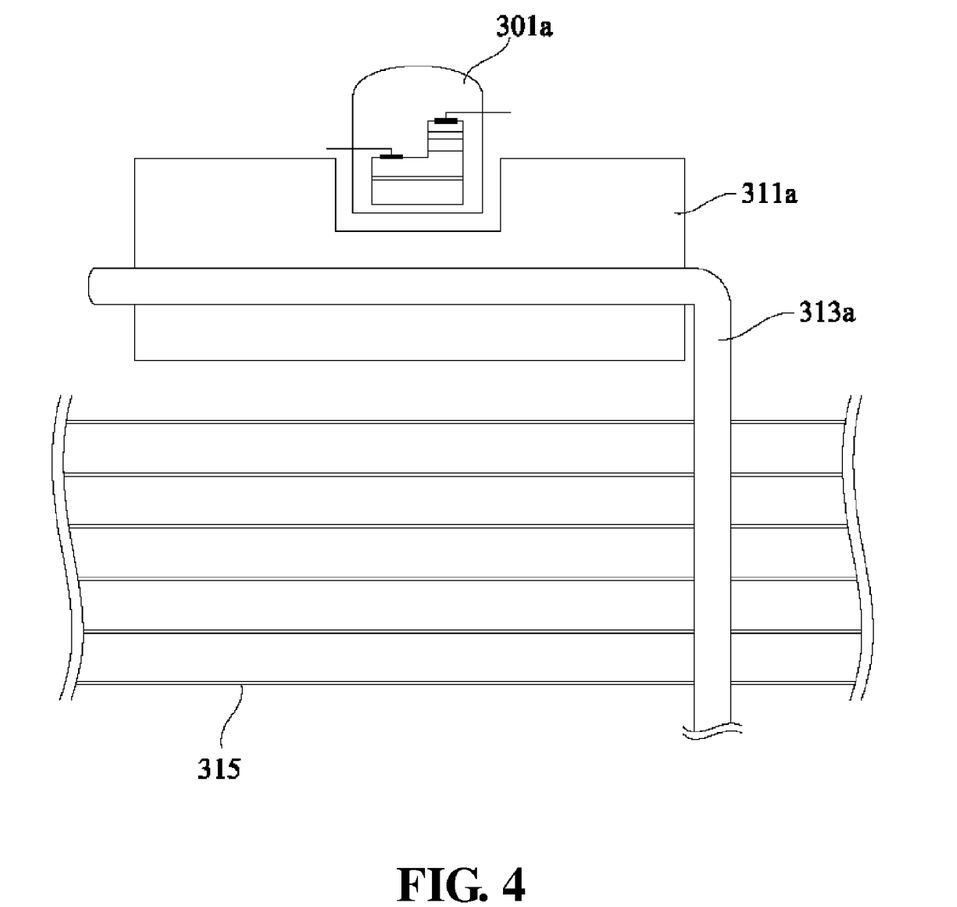
FIG. 4 is a schematic view of a heat dissipation device of the second embodiment of this invention.

To match the number of the light sources, the heat dissipation device 31 of this embodiment may comprise three heat conductive plates 311a, 311b, 311c, three heat conductive units, and a plurality of heat sinks 315. The three heat conductive units described in this embodiment may be heat pipes 313a, 313b, and 313c, respectively. For example, to transmit heat efficiently, the heat conductive plate 311a is thermally connected with the first light source 301a, and the heat pipe 313a is in turn thermally connected with the heat conductive plate 311a and the heat sinks 315 at both ends, respectively, as shown in FIG. 4. In this way, heat from the first light source 301a can be transmitted to the heat conductive plate 311a in contact therewith, and guided to the heat sinks 315 through the heat pipe 313a before being dissipated into the exterior environment.

In reference to FIGS. 3A and 3B, in this embodiment, the light sources 301a-301b and the projection lens set 20 are disposed on the same side, while each of the heat pipes 313a, 313b, 313c extends towards the opposite side and the heat sinks are also disposed on the opposite side. In other words, each of the heat pipes 313a, 313b, and 313c extends towards the heat sinks 315. Such a configuration may reduce the volume of the projection apparatus, and isolates the heat dissipation area from the optical area effectively to avoid the impact of heat on various optical elements and further increase the heat dissipation efficiency effectively in a concentrated dissipation manner.

It can be appreciated from the above embodiments that the light sources are not limited to the LEDs, and the LEDs are also not limited to the colors described above. It should be further noted that each of the light sources 301a-301c may further be integrated with the heat dissipation device 31 into a single module (not shown), such that the module may be detachably disposed in the projection apparatus 3. This is also a concept to be expressed in this invention. The kind, location, and number of individual optical elements described in the above embodiments are only intended to illustrate this invention. Other implementation aspects may readily occur to those skilled in the art.

It follows from the above description that the DLP projection apparatus using two DMDs in accordance with this invention may employ LEDs as a light source. Since LEDs have more pure color because the narrow bandwidth, a wider color gamut is obtained. Moreover, since such a light source can be started up in a short time, it allows the rapid startup of the projection apparatus. After the light source is powered off, the latency time to turn off the projection apparatus may be shortened significantly. Further, the problem of mercury pollution is eliminated. Additionally, the color wheel and some other optical elements may be omitted, which may shrink the overall dimension of the illumination system significantly, simplify the system structure, and reduce the manufacturing cost of the projection apparatus. Consequently, the DLP projection apparatus comprising two DMDs in accordance with this invention has an improved display color, imaging luminance, and efficiency.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection apparatus, comprising:
a first light source for providing a first colored light;
a second light source for providing a second colored light;
a third light source for providing a third colored light;
a first light guiding device for guiding the second colored light and the third colored light;
a first digital micromirror device (DMD) adapted to modulate and reflect the first colored light;
a second digital micromirror device (DMD) adapted to modulate and reflect the second colored light and the third colored light both of which are guided by the first light guiding device;
a second light guiding device for projecting colored lights from the first DMD and the second DMD wherein the first light source, the second light source, and the third light source are a green LED, a red LED, and a blue LED for providing a green light, red light, and blue light, respectively;
a projection lens set disposed at the same side of the first, second and third light sources; and
a heat dissipation device comprising:
three heat conductive units being in contact with the first, second and third light sources, respectively; and
a plurality of heat sinks being connected with the three heat conductive units, wherein the heat conductive units and the plurality of heat sinks extend from the light sources and the projection lens towards the opposite side of the first DMD, the second DMD, the first light guiding device and the second light guiding device.

2. The projection apparatus of claim 1, further comprising a first prism and a second prism, in which the first prism is disposed between the first DMD and the second light guiding device, and the second prism is disposed between the second DMD and the second light guiding device.

3. The projection apparatus of claim 2, wherein each of the first prism and the second prism is a total internal reflection (TIR) prism.

4. The projection apparatus of claim 1, wherein the first light guiding device is a dichroic mirror.

5. The projection apparatus of claim 1, wherein the second light guiding device is a dichroic cube.

6. The projection apparatus of claim 1, further comprising a first integration rod, a second integration rod and a third integration rod, disposed adjacent to the first light source, the second light source and the third light source, respectively, for uniformizing the first colored light, the second colored light and the third colored light emitted from the first light source, the second light source and the third light source, respectively.

7. The projection apparatus of claim 1, wherein each of the second colored light and the third colored light is illuminated alternately with a duty cycle of about 40% to 60%.

8. The projection apparatus of claim 1, wherein the heat dissipation device further comprises three heat conductive plates in contact with the first, second and third light sources, respectively, wherein the plurality of heat sinks are disposed at the same side, and the three heat conductive units connect the heat conductive plates, each of the heat conductive units extending towards the heat sinks and being connected with the heat sinks in a thermal connection, whereby heat transmitted from the light sources to the heat conductive plates is guided to the heat sinks.

9. The projection apparatus of claim 1, wherein the heat conductive plate is a copper plate.

10. The projection apparatus of claim 1, wherein the heat conductive unit is a heat pipe.

11. The projection apparatus of claim 1, wherein the heat sink is made of copper or aluminum.

12. A projection apparatus, comprising:
a green light emitting diode (LED) for providing a green light;
a red LED for providing a red light;
a blue LED for providing a blue light;
a first digital micromirror device (DMD) adapted to modulate and reflect the green light;
a second DMD adapted to modulate and reflect the red light and the blue light;
wherein the red LED and the blue LED illuminate alternately;
a projection lens set disposed at the same side of the green, red and blue light LEDs; and
a heat dissipation device comprising:
three heat conductive units being in contact with the green, red and blue light LEDs, respectively; and
a plurality of heat sinks being connected with the three heat conductive units, wherein the heat conductive units and the plurality of heat sinks extend from the LEDs and the projection lens towards the opposite side of the first and second DMDs.

13. The projection apparatus of claim 12, further comprising a first prism and a second prism, the first prism being configured for guiding the green light, which is then modulated and reflected by the first DMD, and the second prism being configured for guiding the red light and the blue light, which are then modulated and reflected by the second DMD.

14. The projection apparatus of claim 13, further comprising a dichroic cube, in which the green light reflected by the first DMD, and the red light and the blue light reflected by the second DMD are guided to the dichroic cube by the first prism and the second prism, respectively, and then outwardly projected.

15. The projection apparatus of claim 12, further comprising a first integration rod, a second integration rod and a third integration rod, disposed adjacent to the green LED, the red LED and the blue LED, respectively, for uniformizing the green light, the red light and the blue light, respectively.

16. The projection apparatus of claim 15, further comprising a dichroic mirror for guiding the red light from the second integration rod and the blue light from the third integration rod.

17. The projection apparatus of claim 12, wherein each of the red LED and the blue LED is illuminated alternately with a duty cycle of about 40% to 60%.

18. The projection apparatus of claim 12, wherein the heat dissipation device further comprises three conductive plates in contact with the LEDs, respectively, wherein the plurality of heat sinks are disposed at the same side and the three heat conductive units connect the heat conductive plates, each of the heat conductive units extending towards the heat sinks and being connected with the heat sinks in a thermal connection, whereby heat transmitted from the LEDs to the conductive plates is guided to the heat sinks.

19. The projection apparatus of claim 12, wherein the heat dissipation device is an integrated module detachably disposed in the projection apparatus.

* * * * *